3,344,796
FLAVORED TOBACCO SMOKE FILTER CONTAINING HIGHER FATTY ACID ESTER OF SUCROSE

Goro Yamaji, Yokohama-shi, and Toshiki Ohtake, Zushi-shi, Japan, assignors to Dai Nippon Seito Kabushiki Kaisha, Tokyo, Japan, a corporation of Japan
No Drawing. Filed May 17, 1965, Ser. No. 456,489
5 Claims. (Cl. 131—267)

This invention relates to an improved tobacco smoke filter. More particularly, this invention concerns a tobacco smoke filter incorporating a flavoring solution containing a higher fatty acid ester of sucrose in addition to a flavoring substance. Herein, the expression "higher fatty acid ester of sucrose" means a sucrose ester in which one to three hydrogens of the eight hydroxyl groups of a sucrose molecule are substituted with acyl groups or higher fatty acid residues having twelve to eighteen carbon atoms such as lauroyl, myristoyl, palmitoyl and stearoyl, and at least one (preferably three or more) of the remaining hydroxyl hydrogens is substituted with acetyl groups. Also, the "flavoring substance" means a flavor (substance) to be used for the flavoring of tobacco, such as menthol. Further, the "filter material" means cellulose secondary acetate, regenerated cellulose, paper, etc.

It is an object of the invention to provide a flavored tobacco smoke filter.

It is another object of the invention to obtain a tobacco smoke filter which excellently preserves a flavor substance by an extremely simple flavoring procedure.

It is a further object of the invention to provide a tobacco smoke filter which constantly and lastingly generates flavor during smoking and gives improved aroma and taste.

It is a still further object of the invention to provide a tobacco smoke filter having improved filtering property.

The foregoing, and other objects and features of our invention will be apparent from the following description.

The present inventors have found that those objects can be attained by employing a flavoring substance which is mixed with certain sucrose esters (herein, referred to as a higher fatty acid ester of sucrose).

The higher fatty acid esters of sucrose used in the present invention are novel compounds which have never before been described in the literature, and in which one to three hydrogens of the eight hydroxyl groups of sucrose are substituted with at least one of the acyl groups having twelve to eighteen carbon atoms, and furthermore all or a part of the remaining hydroxyl hydrogens are substituted with acetyl groups in order to impart oleophilic property. The following are examples of such novel compounds and their properties:

TABLE 1

| | $[\alpha]_D^{20}$* | Melting point or state |
|---|---|---|
| Sucrose monopalmitoyl heptaacetate | 45.78 | Viscous oil. |
| Sucrose monopalmitoyl hexaacetate | 41.37 | Do. |
| Sucrose monopalmitsyl pentaacetate | 35.04 | Do. |
| Sucrose monolauroyl heptaacetate | 49.53 | Do. |
| Sucrose monomyristoyl heptaacetate | 47.70 | Do. |
| Sucrose monopalmitoyl heptaacetate | 45.78 | Do. |
| Sucrose monostearoyl heptaacetate | 44.20 | White viscous liquid. |
| Sucrose dilauroyl hexaacetate | 43.77 | 37° C.–40° C.† |
| Sucrose dimyristoyl hexaacetate | 42.06 | 48° C.–51°C.† |
| Sucrose dipalmitoyl hexaacetate | 39.10 | 34° C.–35° C. |
| Sucrose distearoyl hexaacetate | 37.65 | 43° C.–45° C. |
| Sucrose trilauroyl pentaacetate | 37.97 | Viscous oil. |
| Sucrose trimyristoyl pentaacetate | 33.03 | Do. |
| Sucrose tripalmitoyl pentaacetate | 32.47 | 26° C.–27° C. |
| Sucrose tristearoyl pentaacetate | 31.93 | 41° C.–42° C. |

* The specific rotatory power is determined as a 4% chloroform solution at 20° C.
† Were crystallized gradually.

As to the properties of the higher fatty acid esters of sucrose, the greater the number of carbon atoms, the higher the melting point, while the smaller the number of carbon atoms, the higher the viscosity. Such tendency also appears with respect to the number of substitutions with the acyl group. For instance, sucrose monomyristoyl heptaacetate is a millet jelly-like and highly viscous substance at room temperature, while sucrose distearoyl hexaacetate is a white wax-like solid at room temperature.

The most important property of the higher fatty acid esters of sucrose used in the present invention is that the sucrose ester bonds a flavoring substance to a tobacco smoke filter material without regard to the nature of the filter material, that is, synthetic fiber as well as natural fiber may be used, the sucrose ester preserving the flavoring substance at room temperature and releasing the flavor when subjected to the heat of tobacco smoke.

The higher fatty acid esters of sucrose used in the present invention are different in the following respects from the lower fatty acid esters of sucrose which are used in U.S. Patent No. 3,008,474 for the purpose of improving the filtering property of tobacco smoke filter and bonding powder additives to a filter material. Such lower fatty acid esters of sucrose are esters of sucrose, glucose or methyl glycoside with lower fatty acids, for example, sucrose octaacetate, α-methyl-D-glycoside tetraacetate, sucrose octapropionate etc. All of these esters are solid at room temperature and easily crystallize from organic solvents. Sucrose octaacetate has lowered compatibility with menthol and only weakly preserves a flavoring substance as provien by the fact that said sucrose ester does not possess any fatty acid residue having a long chain ($C_{12}$–$C_{18}$).

Accordingly, such a lower fatty acid ester of sucrose can not be practically used. On the contrary, the higher fatty acid esters of sucrose employed in the present invention are either liquids or solids of low melting point at room temperature. They do not crystallize from organic solvents, but can excellently preserve a flavoring substance.

The process for preparing the sucrose esters used in the present invention is not particularly limited, but the following process is preferable. Sucrose is reacted with a fatty acid having twelve to eighteen carbon atoms in a solvent such as tertiary amines, amides or dimethyl sulfoxide, in the presence of an alkali catalyst at temperatures of about 20° C.–180° C. to produce mono-, di-, or tri-ester of sucrose, and then all or a part (at least one, preferably three or more) of the remaining hydroxyl hydrogens of the resulting mono-, di-, or tri-ester of sucrose or their mixture are acetylated with acetic anhydride in the presence of a catalyst such as anhydrous sodium acetate or anhydrous zinc chloride or pyridine. By this process of preparation, a mixture of two or more kinds of esters is usually obtained, and this mixture is used as it is.

The optimum amount of higher fatty acid esters of sucrose used in the present invention depends on the type of the flavoring substance and the solvent used, but, in general, 1% to 20% by weight is suitable, based on the total weight of the compound flavor, i.e., the flavoring solution. Amounts higher than the upper limit as mentioned above have unfavorable effect on the preparation of tobacco smoke filter in respects of the solubility of the ester and the viscosity of the flavoring solution. Amounts less than the lower limit are not effective. The amount of the compound flavor, i.e., the flavoring solution, to be employed in a tobacco smoke filter depends on the filter material, but it ranges 1–20% by weight based on the weight of the filter material. Amounts higher than the upper limit mentioned above have an unfavorable effect on the physical properties of the filter, such as resistance to permeability and hardness, while, when amounts less than the lower limit are employed, the effect of addition of the higher fatty acid esters is markedly reduced. Accordingly, an amount of the flavoring solution outside of the above-mentioned range fails to attain the purpose of the present invention.

A filter according to the present invention can be produced by using conventional apparatus for the production of filter either as it is or slightly modified. For instance, in the case of an acetate filter in which a cellulose secondary acetate is used as the filter material, the higher fatty acid ester of sucrose and a flavoring substance are dissolved in a plasticizer for the acetate (for example, triacetyl glycerine) to prepare a flavoring solution, and the resulting solution is added to a spread out acetate tow by a plasticizer-adding-apparatus and rolled up by a rod-making-machine to produce a flavored filter. Also, in the case of a cellulose filter in which a regenerated cellulose is used as the filter material, the higher fatty acid ester of sucrose and a flavor are dissolved or dispersed in a resin solution for bonding. Furthermore, in the case of a paper filter in which paper is used as the filter material, a flavoring solution prepared by dissolving or dispersing a higher fatty acid ester of sucrose, and a flavoring substance in a solvent (for example, ethyl alcohol) is added by spraying at a zone immediately before a crumpled crepe paper is introduced into a filter-rod-making-machine, thereby producing a flavored filter.

The features and advantages of the present invention will now be described in detail.

The first feature and advantage is that the addition of flavoring substance to a filter enhances the efficiency of flavoring and conserves the flavoring substance. That is, in a conventional tobacco with a filter, a flavor is added to the cut tobacco portion in the same manner as to a tobacco without a filter. When such a tobacco with a filter is smoked, a part of the added flavoring substance is decomposed by combustion during the smoking and a part thereof is transferred to the main stream smoke. Furthermore, a part of the flavor is filtered off in the filter portion. Thus, a considerable amount of the flavoring substance is lost.

On the other hand, when a flavor is added to a filter portion, such decomposition by combustion as above mentioned is completely avoided and a loss by filtration at the filter portion hardly occurs. It is clearly economical of flavoring substance as compared with the addition of flavoring substance to the cut tobacco portion. (When flavoring a cut tobacco, the flavoring substance is usually sprayed as a solution in a solvent such as ethyl alcohol, but this spraying method is of low flavoring efficiency. Therefore, it is practically far more economical to add the flavoring substance to a filter portion.)

The second feature and advantage is that a filter is uniformly and easily flavored by adding the higher fatty acid esters of sucrose to a flavor solution for the filter. As mentioned previously, in the case of flavoring an acetate filter or regenerated cellulose filter, the flavoring is effected by dissolving the flavoring substance in either a plasticizer or a resin solution for bonding. If a powder flavor, such as menthol, is employed and, moreover, a large amount thereof must be used, it is necessary to prevent precipitation of the dissolved flavor. The higher fatty acid esters of sucrose used in the present invention have excellent compatibility with menthol and other flavors, as well as with plasticizers for cellulose secondary acetate (for example, triacetyl glycerine). Thus, if a higher fatty acid ester of sucrose is added upon dissolving menthol or other flavors in plasticizers, etc., the resulting flavoring solution is homogeneous and, even at lower temperature, becomes a gel-like material at the worst. Thus, the flavoring solution still remains in a homogeneous state. Therefore, according to the present invention, the filter is uniformly flavored. On the contrary, if a higher acid ester of sucrose is not used, menthol or other flavors disadvantageously precipitate and the flavoring solution is non-homogeneous.

The third feature and advantage are the improved aroma and taste. A flavor, such as menthol, added to a filter according to the present invention is present in the filter as a solid solution, such as a viscous gel, formed from the menthol or other flavors and the higher fatty acid esters of sucrose, depending on the properties of the higher fatty acid ester of sucrose utilized. In such state, the bonding between the flavor and the filter material is strong and the preservation of the flavor is excellent. Such state is remarkably different from that in the case in which crystals of menthol, or other flavors, precipitate on the surface of the fiber or paper. Further, upon smoking, the flavor added to the filter is gradually and constantly dissolved out during smoking by the smoke of 30° C.–50° C. passing through the filter so that aroma and taste of tobacco are improved. These points are a great progress as compared with a conventional tobacco flavored in its cut tobacco portion, since in the conventional tobacco, flavor is strongly felt only at the beginning of smoking, but gradually becomes felt rather weakly. On the other hand, unfavorable adsorption of moisture by a filter is inhibited by adding the higher fatty acid ester of sucrose, which is oleophilic, to the filter, and adsorption of the flavorant substances is accelerated by the surface active effect of the higher fatty acid ester of sucrose. Thus aroma and taste of tobacco are improved.

The following examples are given for purposes of illustration and not by way of restriction. In the following examples, the parts and percentage given are by weight.

*Example 1*

| | Parts |
|---|---|
| Triacetyl glycerine | 80 |
| Sucrose distearoyl hexaacetate | 10 |
| Menthol | 9 |
| Peppermint oil | 1 |

A flavoring solution is prepared using the materials of the above-mentioned weight ratio. That is, triacetyl glycerine is first heated to 40° C.–50° C. and maintained at that temperature, for some time. Then distearoyl hexaacetate is added thereto with stirring to dissolve therein. The resulting solution is cooled to about 35° C. and menthol is dissolved therein. Finally, peppermint oil is added followed by thorough agitation.

The flavoring solution thus obtained is added to a spread out cellulose secondary acetate tow of filament denier 4 (a fiber having weight of 0.2 g./450 m. length) and total denier 60,000 (a tow made by bundling many filaments, 3,000 g./450 m.) in an amount of 8% by weight based on the weight of filaments, by a plasticizer-adding-machine. Then, the tow containing the flavoring solution is sent to a rod-making machine, rolled up by a filter-wrapping-paper, and then cut to the desired length of tow.

Thus, the menthol-flavored-filter is easily produced by the well known acetate filter manufacturing systems. The filter characteristics, such as weight, hardness, resistance to permeability, filtration ability of total alkaloids etc., of the menthol-flavored-filter produced by the present invention are almost the same as those of a usual filter in which triacetyl glycerine alone is used as a plasticizer as shown below. And when attached to a tobacco, the filter of the present invention gives better taste than the control.

TABLE 2

| Sample | Triacetyl glycerine (no sucrose ester) | | Example 1 | |
|---|---|---|---|---|
| Measured value* | Average | Standard deviation | Average | Standard deviation |
| Measured item: | | | | |
| Length, mm | 17 | | 17 | |
| Circumference, mm | 25.7 | | 25.7 | |
| Weight, g./piece | 0.17 | 0.01 | 0.17 | 0.01 |
| Resistance to permeability, mm. H₂O | 53 | | 52 | |
| Hardness, mm./10 | 4.6 | 0.35 | 5.4 | 0.47 |
| Filtration rate of total alkaloid, percent | 32.6 | | 33.1 | |
| Menthol content, mg./piece | 0 | | 0.93 | |

* Averaged value of 20 pieces of samples.

*Example 2*

| | Parts |
|---|---|
| Triacetyl glycerine | 78.5 |
| Sucrose distearoyl hexaacetate | 3.5 |
| Sucrose dipalmitoyl hexaacetate | 1.5 |
| Menthol | 15 |
| Peppermint oil | 1.5 |

A flavoring solution composed of the above-mentioned ingredients is prepared by following the same procedure as in Example 1. The flavoring solution thus obtained is added to a spread out acetate tow of filament denier 4 and total denier 55,000 in an amount of about 8% by weight and the resulting tow is rolled up in the same manner as in Example 1 to produce a menthol flavored filter which gives excellent taste.

The two higher fatty acid esters of sucrose are prepared by using a hardened beef tallow containing stearate and palmitate in a weight ratio of 7:3.

*Example 3*

| | Parts |
|---|---|
| Triacetyl glycerine | 90 |
| Sucrose monopalmitoyl heptaacetate | 7 |
| A conventional compound flavor containing menthol for tobacco | 3 |

A flavoring solution is prepared by using the above-mentioned ingredients and following the procedure of Example 1. And a flavored filter is produced following the procedure of Example 1 or Example 2, but the ratio of flavoring solution to filter may be changed.

*Example 4*

| | Parts |
|---|---|
| Polyethylene glycol (degree of polymerization, 400–600) | 30 |
| Ethyl alcohol | 30 |
| Sucrose monomyristoyl heptaacetate | 20 |
| Olive oil | 10 |
| Menthol | 7 |
| Spearmint oil | 3 |

A mixture of the above mentioned ingredients is warmed at 30–35° C. to form a compound flavor, i.e. a flavoring solution. The resulting flavoring solution is uniformly coated or sprayed on a sheet of crepe paper, weight 36 g., having 5 waves per cm., and then the crepe paper is shaped by well known methods to produce menthol-flavored-filters using paper as the filter material.

*Example 5*

| | Parts |
|---|---|
| Acetone | 88 |
| Vinyl acetate (degree of polymerization, 500) | 8 |
| Polyvinyl methyl ether | 0.5 |
| Sucrose monopalmitoyl heptaacetate | 1.5 |
| Menthol | 2 |

A rayon sliver of 71 mm. length formed from staple fibre of filament denier 3 is soaked in a resinous liquid, i.e. a flavoring solution, prepared by mixing the above-mentioned ingredients, followed by squeezing, shaping and drying, and shaped to produce a menthol-flavored-filter having rayon as the filter material by well known methods.

The present invention is based on our discovery that the higher fatty acid esters of sucrose, such as sucrose distearoyl hexaacetate, are most suitable for adding menthol or other flavors to a filter, and that such filter, during storage thereof, or of tobacco having the filter, the added flavor is hardly lost by vaporization but on the contrary, excellently preserved, and also the flavor is lastingly and constantly dissolved in the smoke passing through the filter upon smoking. Thus, the present invention provides a process for easily producing excellently flavored filters of high quality by employing the novel higher fatty acid esters of sucrose and using conventional apparatus for producing tobacco smoke filters.

What we claim is:

1. A tobacco smoke filter made up of a filter material carrying a flavoring solution in an amount of 1% to 20% by weight of the filter material, which flavoring solution contains a flavorant and at least one of the higher fatty acid esters of sucrose, in which one to three hydrogens of the eight hydroxyl groups in the sucrose molecule are substituted with at least one of the acyl groups having twelve to eighteen carbon atoms, and at least one of the remaining hydroxyl hydrogens is substituted with acetyl groups, in an amount of 1% to 20% by weight of the flavoring solution.

2. A filter in accordance with claim 1 wherein the acyl group is selected from the group consisting of lauroyl, myristoyl, palmitoyl and stearoyl.

3. A filter in accordance with claim 1 wherein the flavoring solution essentially consists of acetate plasticizers, said higher fatty acid ester of sucrose, and menthol flavorant.

4. A filter in accordance with claim 1 wherein the filter material is cellulose acetate filaments.

5. A filter in accordance with claim 1 wherein the filter material is crepe paper.

References Cited

UNITED STATES PATENTS

| 2,228,383 | 1/1941 | Berl. | |
| 3,008,474 | 11/1961 | Touey et al. | 131—266 |

FOREIGN PATENTS

| 173,262 | 12/1952 | Austria. |

SAMUEL KOREN, *Primary Examiner.*

D. J. DONOHUE, *Assistant Examiner.*